United States Patent
Tawosi et al.

(10) Patent No.: US 12,222,984 B1
(45) Date of Patent: Feb. 11, 2025

(54) SYSTEM AND METHOD FOR PROVIDING VIDEO QUERY

(71) Applicant: JPMorgan Chase Bank, N.A., New York, NY (US)

(72) Inventors: Vali Tawosi, London (GB); Salwa Husam Alamir, Bournemouth (GB); Natraj Raman, London (GB); Sameena Shah, Scarsdale, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/367,197

(22) Filed: Sep. 12, 2023

(51) Int. Cl.
*G06F 16/732* (2019.01)
*G06F 16/738* (2019.01)

(52) U.S. Cl.
CPC .......... *G06F 16/732* (2019.01); *G06F 16/738* (2019.01)

(58) Field of Classification Search
CPC .............................. G06F 16/732; G06F 16/738
See application file for complete search history.

(56) References Cited

U.S. PATENT DOCUMENTS

| | | | | |
|---|---|---|---|---|
| 8,185,543 B1* | 5/2012 | Choudhry | ............. | G06F 16/738 |
| | | | | 707/767 |
| 10,360,942 B1* | 7/2019 | Delachanal | .......... | G11B 27/031 |
| 2011/0004588 A1* | 1/2011 | Leitersdorf | ........... | G06F 16/951 |
| | | | | 707/711 |
| 2012/0254234 A1* | 10/2012 | LaJoie | .................... | G06F 16/64 |
| | | | | 707/769 |
| 2013/0212089 A1* | 8/2013 | Lederer | ................. | G06F 16/245 |
| | | | | 707/723 |
| 2013/0275353 A1* | 10/2013 | Ingrassia, Jr. | ......... | H04L 65/612 |
| | | | | 706/46 |
| 2014/0210590 A1* | 7/2014 | Castro | ................. | H04L 12/2816 |
| | | | | 340/5.52 |
| 2015/0082277 A1* | 3/2015 | Champlin-Scharff | ...... | |
| | | | | G06F 11/3664 |
| | | | | 717/120 |
| 2018/0300502 A1* | 10/2018 | Mandal | ................. | G06F 16/258 |
| 2021/0049354 A1* | 2/2021 | Gao | ..................... | G06V 40/172 |
| 2022/0350967 A1* | 11/2022 | Vijayaraghavan | ......................... | |
| | | | | G06Q 10/0631 |

* cited by examiner

*Primary Examiner* — Cam Y T Truong
(74) *Attorney, Agent, or Firm* — Greenblum & Bernstein, P.L.C.

(57) ABSTRACT

A method and system for providing a video query are disclosed. The method includes acquiring context information, training a first machine learning (ML) model using historical data of the software life cycle tool, and removing, by the first ML model, noise from the context information for generating a query including at least one keyword. Once the query is generated, executing, by a second ML model, the query to retrieve at least one video segment from a learning repository. Scoring and ranking is then performed on the at least one video segment. The ranked video segment is then transmitted, to the user interface of the software life cycle tool, and displayed in an ad-hoc manner.

19 Claims, 5 Drawing Sheets

SYSTEM AND METHOD FOR PROVIDING VIDEO QUERY

TECHNICAL FIELD

This disclosure generally relates to data processing. More specifically, the present disclosure generally relates to performing a video query based on context information for providing ad-hoc training.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Learning in the flow of work refers to providing employees with learning opportunities that are integrated into their everyday work-related tasks and activities. More specifically, the learning in the flow of work may provide developers with quick and easy access to an answer or short piece of learning content when they encounter a problem. Learning in the flow of work may be performed by manually searching for issues via an internet search, reading of specific topics in a reference materials, or by conferring with experienced professionals. However, conventional methods of providing learning in the flow of work may be time consuming and often difficult to be practicably performed in a work setting, and thus, may lead to missed learning opportunities.

SUMMARY

According to an aspect of the present disclosure, a method for performing a video query is provided. The method includes acquiring, by a processor, context information via a user interface of a software life cycle tool; training, by the processor, a first machine learning (ML) model using historical data of the software life cycle tool; removing, by the first ML model executed by the processor, extraneous information and noise from the acquired context information; generating, by the first ML model executed by the processor, a query, the query including at least one keyword; executing, by a second ML model executed by the processor, the generated query to retrieve at least one video segment from a learning repository; scoring, by the second ML model executed by the processor, the at least one video segment; ranking, by the second ML model executed by the processor, the at least one video segment based on the scoring; transmitting, by the second ML model executed by the processor and to the user interface of the software life cycle tool, the ranking of the at least one video segment; and displaying, via the user interface of the software life cycle tool, the ranked at least one video segment.

According to another aspect of the present disclosure, the at least one video segment has been transcribed before retrieving the at least one video segment.

According to another aspect of the present disclosure, the learning repository is an internal database.

According to yet another aspect of the present disclosure, the learning repository is a public storage.

According to another aspect of the present disclosure, the learning repository is a combination of an internal database and a public storage.

According to a further aspect of the present disclosure, the internal database is searched prior to the public storage for the at least one video segment.

According to yet another aspect of the present disclosure, the public storage is searched only when the at least one video segment is not stored in the internal database.

According to a further aspect of the present disclosure, the generated query includes less information than the acquired context information.

According to another aspect of the present disclosure, the method further includes identifying a supplemental data item included in the at least one video segment; retrieving the supplemental data item; and providing the supplemental data item along with the at least one video segment for selection.

According to a further aspect of the present disclosure, the supplemental data item is indicated as corresponding to the at least one video segment.

According to a further aspect of the present disclosure, the software life cycle tool is either an issue tracking system or an integrated development environments.

According to a further aspect of the present disclosure, the context information is acquired based on input provided on the user interface of the software life cycle tool.

According to a further aspect of the present disclosure, the context information includes at least one of a file path, software application being used, environment, network, data type, severity of issue, systems of impact, and dependencies.

According to a further aspect of the present disclosure, a portion of the context information is passively captured based on a current task of a developer.

According to a further aspect of the present disclosure, the at least one video segment is one of a plurality of segments of a single video.

According to a further aspect of the present disclosure, in the ranking, the ranking is performed for video segments that receive a score above a reference threshold.

According to a further aspect of the present disclosure, in the transmitting, only video segments above a predetermined ranking are transmitted to the user interface.

According to a further aspect of the present disclosure, in the displaying, highest ranking video segment is played automatically upon receipt by the user interface of the software life cycle tool.

According to an aspect of the present disclosure, a system for performing a video query is provided. The system includes a memory, a display and a processor. The system is configured to perform: acquiring context information via a user interface of a software life cycle tool; training a first machine learning (ML) model using historical data of the software life cycle tool; removing, by the first ML model executed by the processor, extraneous information and noise from the acquired context information; generating, by the first ML model executed by the processor, a query, the query including at least one keyword; executing, by a second ML model executed by the processor, the generated query to retrieve at least one video segment from a learning repository; scoring, by the second ML model executed by the processor, the at least one video segment; ranking, by the second ML model executed by the processor, the at least one video segment based on the scoring; transmitting, by the second ML model executed by the processor and to the user interface of the software life cycle tool, the ranking of the at least one video segment; and displaying, via the user interface of the software life cycle tool, the ranked at least one video segment.

According to another aspect of the present disclosure, a non-transitory computer readable storage medium that stores a computer program for performing a video query is provided. The computer program, when executed by a processor, causes a system to perform multiple processes including: acquiring context information via a user interface of a software life cycle tool; training a first machine learning (ML) model using historical data of the software life cycle tool; removing, by the first ML model executed by the processor, extraneous information and noise from the acquired context information; generating, by the first ML model executed by the processor, a query, the query including at least one keyword; executing, by a second ML model executed by the processor, the generated query to retrieve at least one video segment from a learning repository; scoring, by the second ML model executed by the processor, the at least one video segment; ranking, by the second ML model executed by the processor, the at least one video segment based on the scoring; transmitting, by the second ML model executed by the processor and to the user interface of the software life cycle tool, the ranking of the at least one video segment; and displaying, via the user interface of the software life cycle tool, the ranked at least one video segment.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

Figure 1:
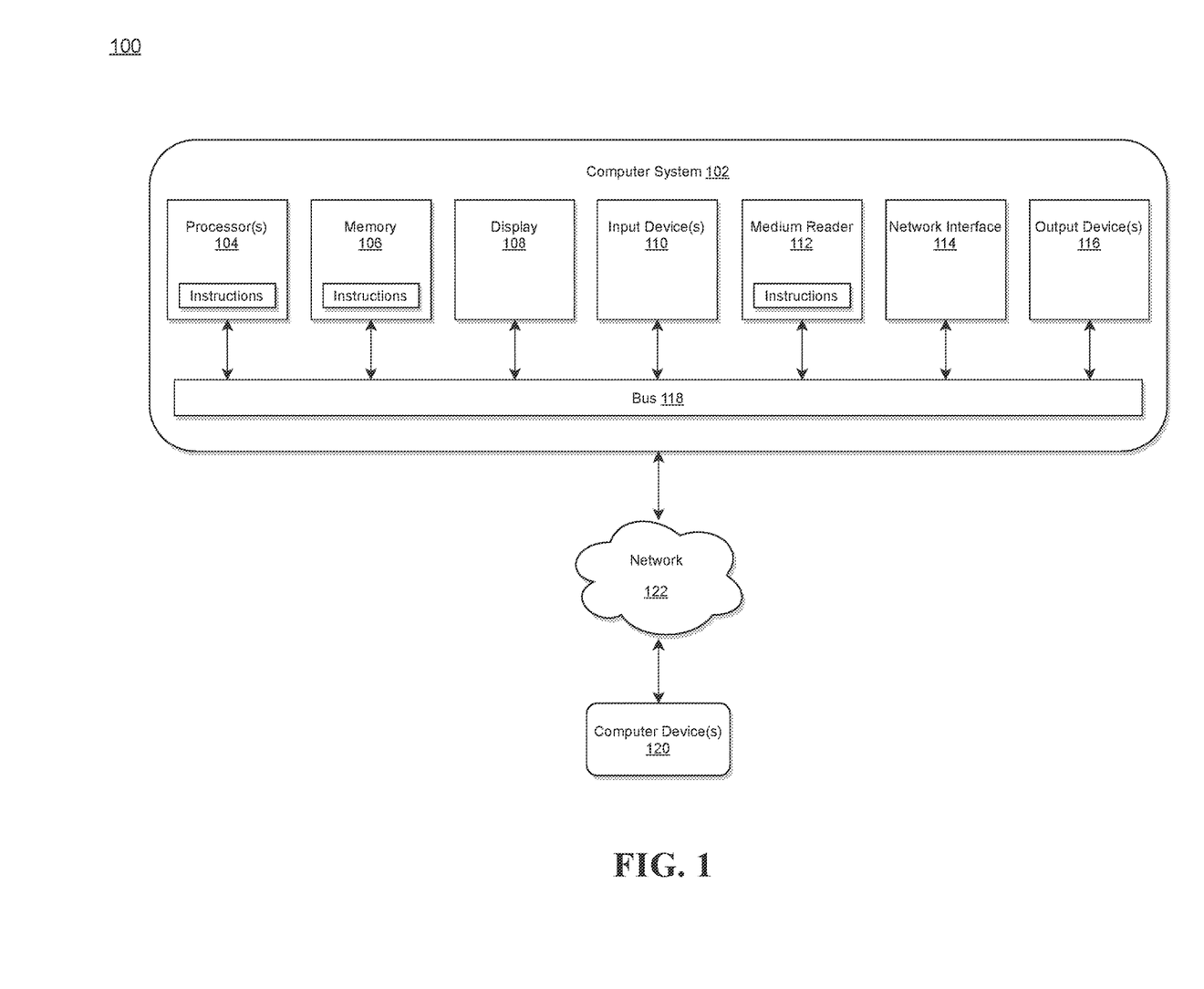
FIG. 1 illustrates a computer system for implementing a video query system in accordance with an exemplary embodiment.

FIG. 1 illustrates a computer system for implementing a video query system in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, or the like.

The computer system 102 may be in communication with one or more additional computer devices 120 via a network 122. The network 122 may be, but is not limited thereto, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
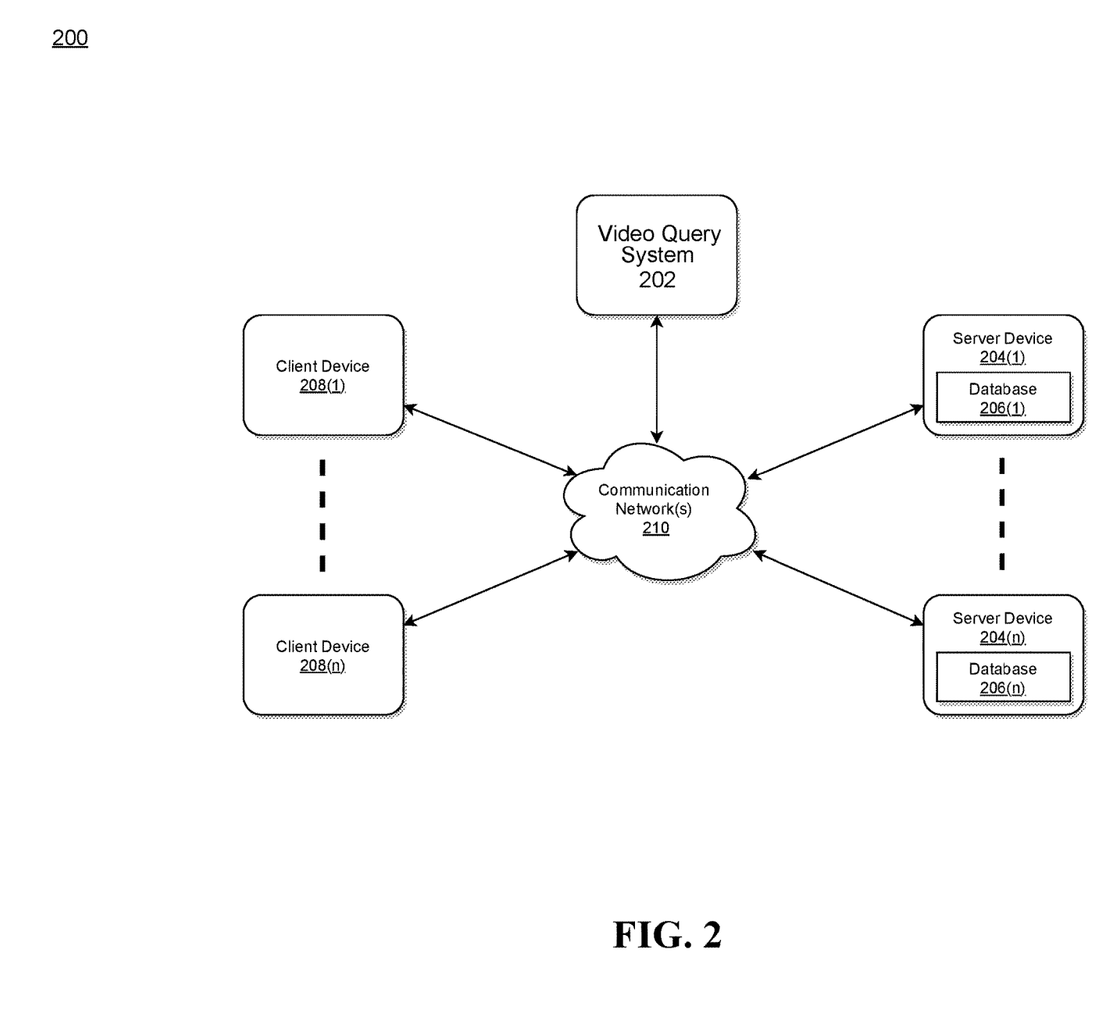
FIG. 2 illustrates an exemplary diagram of a network environment with a video query system in accordance with an exemplary embodiment.

FIG. 2 illustrates an exemplary diagram of a network environment with a video query system in accordance with an exemplary embodiment.

A video query system 202 may be implemented with one or more computer systems similar to the computer system 102 as described with respect to FIG. 1.

The video query system 202 may store one or more applications that can include executable instructions that, when executed by the video query system 202, cause the video query system 202 to perform actions, such as to execute, transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment or other networking environments. The application(s) may be executed within or as virtual machine(s) or virtual server(s) that may be managed in a cloud-based computing environment. Also, the application(s), and even the video query system 202 itself, may be located in virtual server(s) running in a cloud-based computing environment rather than being tied to one or more specific physical network computing devices. Also, the application(s) may be running in one or more virtual machines (VMs) executing on the video query system 202. Additionally, in one or more embodiments of this technology, virtual machine(s) running on the video query system 202 may be managed or supervised by a hypervisor.

In the network environment 200 of FIG. 2, the video query system 202 is coupled to a plurality of server devices 204(1)-204(n) that hosts a plurality of databases 206(1)-206(n), and also to a plurality of client devices 208(1)-208(n) via communication network(s) 210. According to exemplary aspects, databases 206(1)-206(n) may be configured to store data that relates to distributed ledgers, blockchains, user account identifiers, biller account identifiers, and payment provider identifiers. A communication interface of the video query system 202, such as the network interface 114 of the computer system 102 of FIG. 1, operatively couples and communicates between the video query system 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the video query system 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The video query system 202 may be a standalone device or integrated with one or more other devices or apparatuses, such as one or more of the server devices 204(1)-204(n), for example. In one particular example, the video query system 202 may be hosted by one of the server devices 204(1)-204(n), and other arrangements are also possible. Moreover, one or more of the devices of the video query system 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the video query system 202 via the communication network(s) 210 according to the HTTP-based protocol, for example, although other protocols may also be used. According to a further aspect of the present disclosure, in which the user interface may be a Hypertext Transfer Protocol (HTTP) web interface, but the disclosure is not limited thereto.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the video query system 202 that may efficiently provide a platform for implementing a cloud native video query system module, but the disclosure is not limited thereto.

The client devices 208(1)-208(n) may run interface applications, such as standard web browsers or standalone client applications, which may provide an interface to communicate with the video query system 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the video query system 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the video query system 202, the server devices 204(1)-204(n), or the client devices 208(1)-208(n), for example, may be configured to operate as virtual instances on the same physical machine. For example, one or more of the video query system 202, the server devices 204(1)-204(n), or the client devices 208(1)-208(n) may operate on the same physical device rather than as separate devices communicating through communication network(s) 210. Additionally, there may be more or fewer video query system 202, server devices 204(1)-204(n), or client devices 208(1)-208(n) than illustrated in FIG. 2. According to exemplary embodiments, the video query system 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
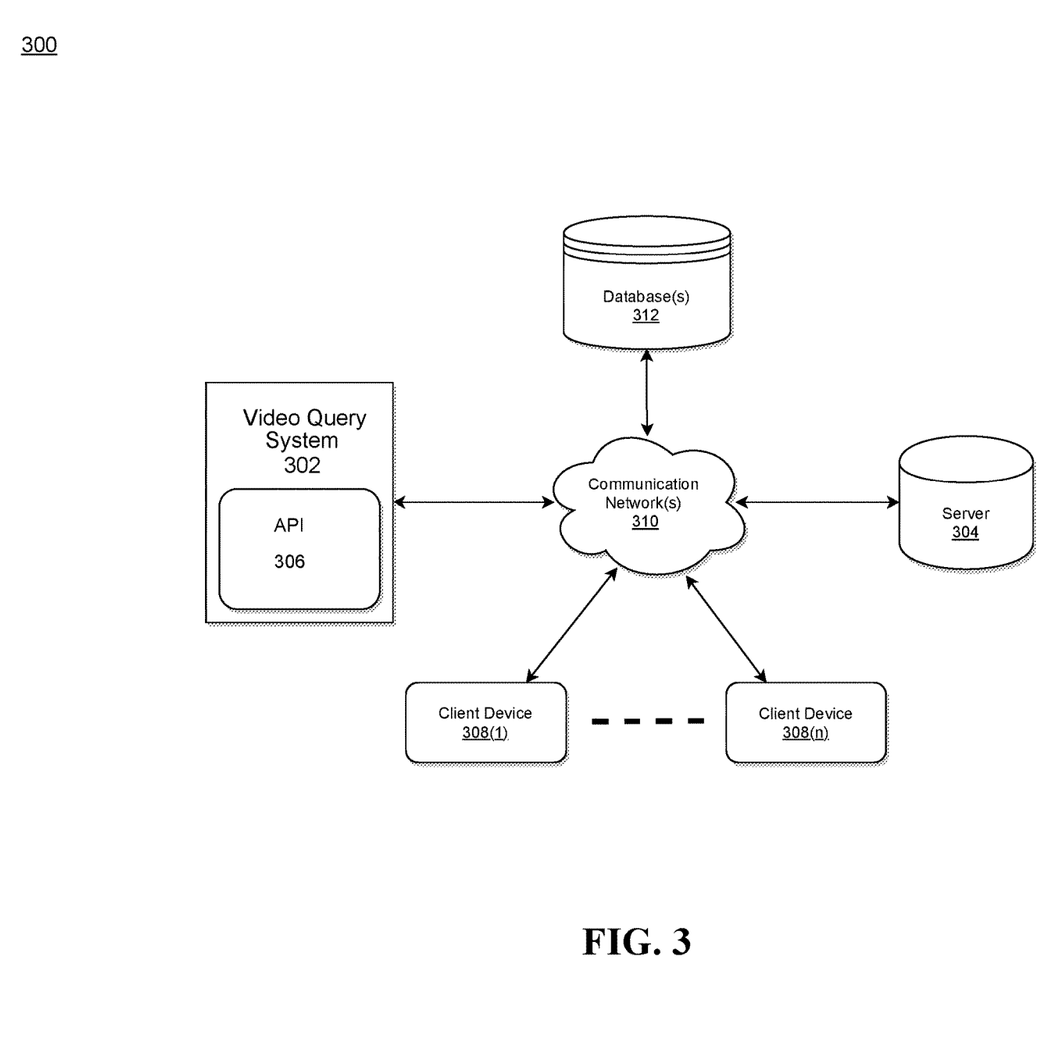
FIG. 3 illustrates a system diagram for implementing a video query system in accordance with an exemplary embodiment.

FIG. 3 illustrates a system diagram for implementing a video query system in accordance with an exemplary embodiment.

As illustrated in FIG. 3, the system 300 may include a video query system 302 within which a group of API modules 306 is embedded, a server 304, a database(s) 312, a plurality of client devices 308(1) . . . 308(n), and a communication network 310.

According to exemplary embodiments, the video query system 302 including the API modules 306 may be connected to the server 304, and the database(s) 312 via the communication network 310. Although there is only one database that has been illustrated, the disclosure is not limited thereto. Any number of databases may be utilized. The video query system 302 may also be connected to the plurality of client devices 308(1) . . . 308(n) via the communication network 310, but the disclosure is not limited thereto.

According to exemplary embodiment, the video query system 302 is described and shown in FIG. 3 as including the API modules 306, although it may include other rules, policies, modules, databases, or applications, for example. According to exemplary embodiments, the database(s) 312 may be embedded within the video query system 302. According to exemplary embodiments, the database(s) 312 may be configured to store configuration details data corresponding to a desired data to be fetched from one or more data sources, but the disclosure is not limited thereto.

According to exemplary embodiments, the API modules 306 may be configured to receive real-time feed of data or data at predetermined intervals from the plurality of client devices 308(1) . . . 308(n) via the communication network 310.

The API modules 306 may be configured to implement a user interface (UI) platform that is configured to enable video query system as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308(n) are illustrated as being in communication with the video query system 302. In this regard, the plurality of client devices 308(1) . . . 308(n) may be "clients" of the video query system 302 and are described herein as such. Nevertheless, it is to be known and understood that the plurality of client devices 308(1) . . . 308(n) need not necessarily be "clients" of the video query system 302, or any entity described in association therewith herein. Any additional or alternative relationship may exist between either or both of the plurality of client devices 308(1) . . . 308(n) and the video query system 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the video query system 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The video query system 302 may be the same or similar to the video query system 202 as described with respect to FIG. 2, including any features or combination of features described with respect thereto.

Figure 4:
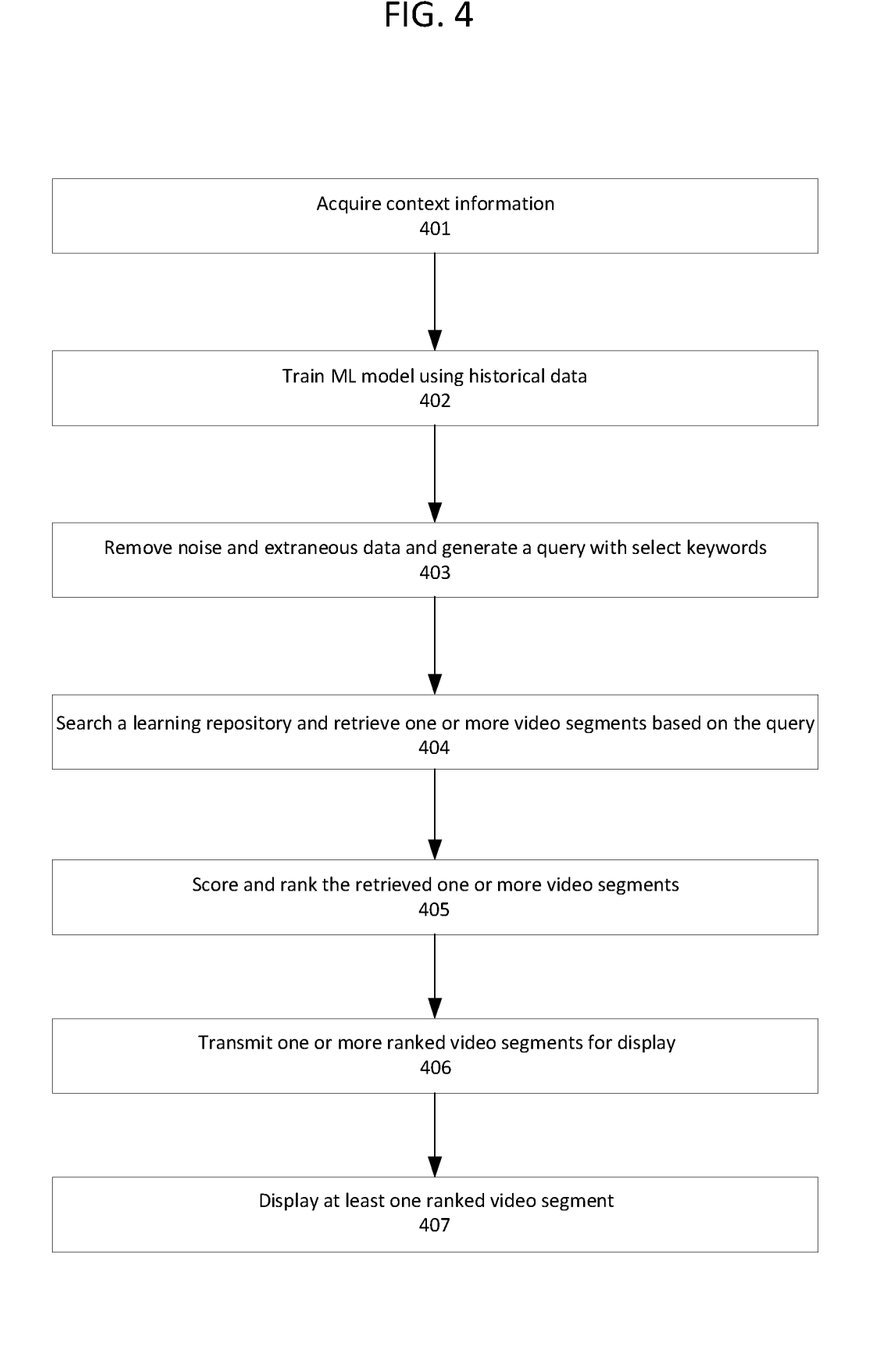
FIG. 4 illustrates a method for performing a video query in accordance with an exemplary embodiment.

FIG. 4 illustrates a method for performing a video query in accordance with an exemplary embodiment.

In operation 401, context information for performing a video query is acquired. According to exemplary aspects, context information may be acquired from information received via a user interface. According to further aspects, the video query user interface may be integrated into a portion of an application or software lifecycle tool already used by a developer (e.g., issue tracking systems (ITS), integrated development environments (IDE) or the like) as a plugin for acquiring context information for performing a video query using existing user interface of the application or software lifecycle tool already used by the developer. By integrating the video query user interface into an existing application or software lifecycle tool, additional operations (e.g., video query) may be performed without performing a separate capture of context information with less usage of display landscape. Although the present disclosure provides integrating the video query user interface into a user interface of an existing application or software lifecycle tool, aspects of the present disclosure are not limited thereto, such that the video query user interface may be a stand-alone user interface.

In an example, context information may be captured in one or more fields entered or viewed by a developer, such as a description field or other fields in the issue tracking system that provides a textual description of an issue incurred. In an example, context information may include, without limitation, a file path, software application being used, environment, network, data type, severity of issue, systems of impact, dependencies and the like. Further, context information may be provided as text information. However, aspects of the present disclosure are not limited thereto, such that other types of information (e.g., graphs, images, formula, data files and the like) may be captured to provide context for processing.

Further to the above, context information may also be inferred from various environment information surrounding a developer. For example, context information may be gathered based on a current task worked on by a developer, an environment that the developer is current working on, applications that are opened, amount of time spent for a particular task or on an application, previous search history, previous project assignment of the developer and the like. Moreover, context information may be inferred based on historical actions or works performed by a respective developers, other historical data and the like by one or more machine learning (ML) or artificial intelligence (AI) algorithms or models.

In operation 402, training of one or more ML or AI algorithms or models may be performed. In an example, the one or more ML or AI algorithms may be performed using historical context data captured for one or more applications. According to exemplary aspects, the historical context data may include select keywords, video segments selected for viewing, a number of video segments viewed for a particular keyword, and the like. Based on training of the ML or AI algorithm or model, the trained ML or AI model may be able to determine a pattern between various keywords and an effective query language for retrieving accurate video segments corresponding to the various keywords. Further, based on the training of the ML or AI algorithm or model, the respective algorithm may be able to decipher what data constitutes relevant keywords and what data constitutes extraneous information or noise.

In an example, AI or ML algorithms may be generative, in that the AI or ML algorithms may be executed to perform data pattern detection, and to provide an output based on the data pattern detection. More specifically, an output may be provided based on a historical pattern of data, such that with more data or more recent data, more accurate outputs may be provided. Accordingly, the ML or AI models may be constantly updated after a predetermined number of runs or iterations are initially performed to provide initial training. According to exemplary aspects, machine learning may refer to computer algorithms that may improve automatically through use of data. Machine learning algorithm may build an initial model based on sample or training data, which may be iteratively improved upon as additional data are acquired.

More specifically, machine learning/artificial intelligence and pattern recognition may include supervised learning algorithms such as, for example, k-medoids analysis, regression analysis, decision tree analysis, random forest analysis, k-nearest neighbors analysis, logistic regression analysis, N-fold cross-validation analysis, balanced class weight analysis, and the like. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, and the like.

In another exemplary embodiment, the ML or AI model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the ML or AI model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the ML or AI models may be generated using at least one from among an artificial neural network technique, a decision tree technique, a support vector machines technique, a Bayesian network technique, and a genetic algorithms technique.

In operation 403, the trained ML or AI model may be executed to remove noise and/or extraneous data, condense filtered context information and generate a query with select keywords. At least since raw context information may be lengthy and include extraneous information as well as other noise, the trained ML or AI model may preprocess the context information to remove information that may not contribute significantly to the query process. By removing extraneous information and/or noise from the context information, less computing resources (e.g., CPU utilization) may be expanded in performing a video query with quicker response time. Further, after removing extraneous information and/or noise, select keywords maybe identified for forming a video query syntax. In addition to the above, the filtered context information having removed extraneous information and/or noise may be condensed (e.g., removal of duplicates or variations of same terminology) for more efficient query searching processing.

In operation 404, the video query is executed for performing a search on a learning repository to identify and retrieve (or identify for retrieval) one or more video segments based on the video query. In an example, learning repository may refer to an internal database storing various training or informational videos. However, aspects of the present disclosure are not limited thereto, such that the learning repository may refer to a public storage or a combination of both. When the learning repository includes both the internal database and the public storage, the internal database may be searched first before searching the public storage. For example, the public storage may be searched only when the internal database does not produce a result. Alternatively, the publish storage may be searched while results from the internal database is being displayed to a user.

According to further aspects, each of the various training or informational videos may have been previously transcribed and embedded with metadata. The metadata may include textual description of the video at various parts of the video, and may include one or more marks to segment a video into multiple video segments. In an example, one video may be segmented into three parts, where the first part or segment describes topic A while the third part or segment describes topic C.

Although present disclosure provides retrieval of select segments or portions of videos, aspects of the present disclosure are not limited thereto, such that corresponding supplemental data items, including but not limited to, documents, images, technical question-answering forums, presentations, contacts and the like may be retrieved along with, or in lieu of, the one or more videos. For example, if the respective video segment includes a discussion of a particular presentation or forum, a corresponding presentation and a link to the respective forum may be provided along with, or in lieu of, the video segment.

In operation 405, once the video segments are retrieved or otherwise identified for retrieval, each of the video segments are scored and ranked based on their relevance. For example, a video segment may be scored based on a number of matches between the keywords in the video query and transcription of the video segment, frequency of keywords in the transcription, video posting date, source of the video, length of the video segment or video or the like. Based on the scoring of the video segments, a rank may be assigned to each of the retrieved video segments. However, aspects of the present disclosure are not limited thereto, such that not all of the video segments may receive a rank. For example, only video segments having a score above a predetermined threshold may receive a rank.

In operation 406, the ranked video segments may then be transmitted to the user interface for display of the ranked video segments. According to exemplary aspects, not all of the ranked video segments may be transmitted for display. For example, only video segments ranked 5 or higher may be transmitted for display to reduce network traffic.

In operation 407, the transmitted video segments may be displayed for selection by the developer. However, aspects of the present disclosure are not limited thereto, such that the top ranked video segment may be played automatically in a thumbnail mode, with other ranked video segments being available for selection. Along with the video segments, corresponding materials may be available for selection. For example, if the ranked video segment includes a slide presentation, the slide presentation may be provided for selection with indication that the slide presentation corresponds to the respectively ranked video segment.

Figure 5:
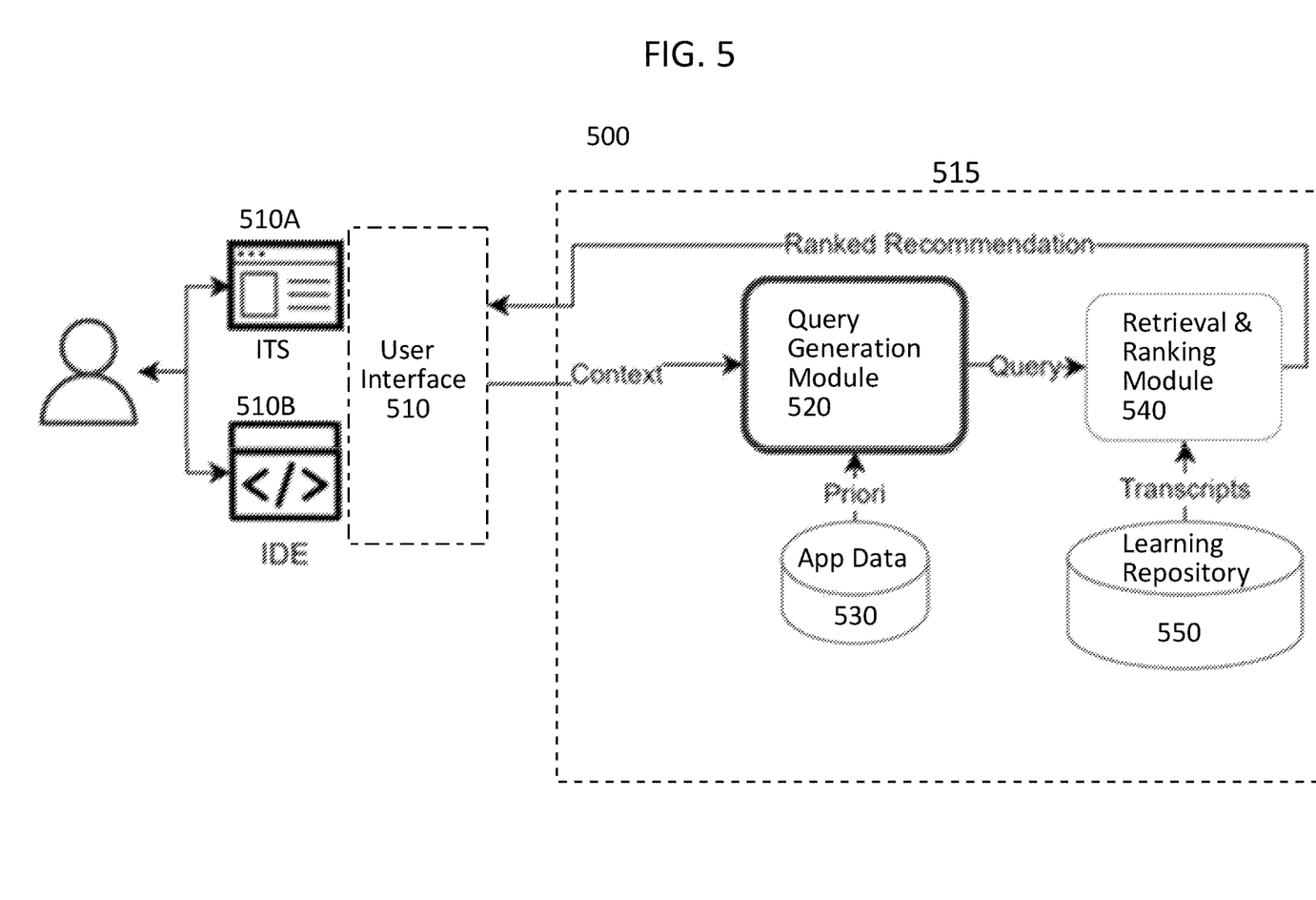
FIG. 5 illustrates a system flow for providing video query in accordance with an exemplary embodiment.

FIG. 5 illustrates a system flow for providing video query in accordance with an exemplary embodiment.

According to exemplary aspects, a video query system may be configured to find and recommend relevant snippets of videos from a learning repository, based on context of a current problem faced by a software developer. Further, the video query system may be integrated with any software lifecycle tool or application, such as issue tracking systems (ITS), integrated development environments (IDE), and the like.

As illustrated in FIG. 5, the video query system includes two ML or AI modules and a user interface. More specifically, the video query system includes an ITS system interface 510A, an IDE system interface 510B, a user interface 510, a query generation module 520, an application data storage 530, a retrieval and ranking module 540 and a learning repository 550.

According to exemplary aspects, the user interface 510 may be configured as a plugin that integrates with one or more system interfaces of supporting tools, such as the issue tracking system or integrated development environment. As illustrated in FIG. 5, the user interface 510 may be configured as a plugin for the ITS system interface 510A and the IDE system interface 510B. Although two system interfaces are illustrated, aspects of the present disclosure are not limited thereto, such that the user interface 510 may be configured as a plugin to more system interfaces. Alternatively, the user interface 510 may be configured as a stand-alone user interface.

More specifically, the user interface 510 may be configured as an add-on software that works with existing user interfacing application or as a stand-alone user interface. In FIG. 5, the user interface 510 is configured as plugins for existing user interfaces of software applications. In an example, when the user interface 510 is configured as add-on software or plug-in, the user interface 510 may appear on a portion on a user interface of an existing software. Accordingly, the user interface 510 may be added seamlessly to existing software to perform context capturing functionality. By providing the user interface 510 as part of an existing software, display of two software applications maybe provided contemporaneously and in a more integrated manner to improve delivery of display information to a user. However, aspects of the present disclosure are not limited thereto, such that the user interface 510 may operate independently from existing software applications.

The user interface 510 configured as a plugin may provide data acquisition and result presentation service. The user interface 510 may collect context information as inputted by a developer (e.g., text input in a description field) and send the collected context information to the query generation module 520 to be processed. Moreover, the user interface 510 may also present or display suggested output content from the retrieval and ranking module 540 after its processing.

Once context information is acquired or collected, the user interface 510 may provide the collected context information to a backend system 515 for further processing. According to exemplary aspects, the backend system 515 may reside on the same network as the user interface 510 or on a cloud network different from a network on which the user interface 510 resides.

According to further aspects, the backend system 515 may digest or process the context information provided by the user interface 510. In an example, context information may include, without limitation, file path, software application being used, environment, network, data type, severity of issue, systems of impact, dependencies and the like. Further, context information may be provided as text information. However, aspects of the present disclosure are not limited thereto, such that other types of information (e.g., graphs, images, formula, data files and the like) may be captured to provide context for processing. Although present disclosure provides the user interface 510 receiving context information by for example, a user input, for processing by the backend system 515, aspects of the present disclosure are not limited thereto, such that context information may be inferred from various disparate sources by one or more ML or AI algorithms or models.

As exemplarily illustrated in FIG. 5, the backend system 515 includes the query generation module 520, the application data storage 530, the retrieval and ranking module 540 and the learning repository 550. The backend system 515 may be configured to digest context information provided by the user interface 510 (or inferred from its environment) and generate a query, retrieve one or more relevant sections or portions of videos stored in a video repository, and rank relevancy of each of the sections or portions based on relevance to the query. In an example, relevant tutorial materials (e.g., portions of videos) may share similar or same semantical context and/or vocabulary as the query. Further, once there is a match between the selected portion or section of the video and the query, a relational correspondence between the semantics included in the selected portion or section of the video and the query may be established for more accurate matching in future iterations.

According to exemplary aspects, the query generation module 520 may be a trained ML or AI algorithm. In an example, the one or more ML or AI algorithms may be performed using historical context data captured for one or more applications or software lifecycle tool stored in the application data storage 530. According to exemplary aspects, the historical context data may include select keywords, video segments selected for viewing, a number of video segments viewed for a particular keyword, and the like. Based on training of the ML or AI algorithm or model, the trained ML or AI model may be able to determine a pattern between various keywords and an effective query language for retrieving accurate video segments corresponding to the various keywords. Further, based on the training of the ML or AI algorithm or model, the respective algorithm may be able to decipher what data constitutes relevant keywords and what data constitutes extraneous information or noise.

Moreover, in view of extensive data available for processing, the query generation module 520 may be configured to condense the context information to a short query to improve retrieval rate of relevant results as well as to make the query processing more efficient and quicker. More specifically, at least because the acquired context information and corresponding retrieved data may be extensive and may include extraneous information and/or noise that may not be relevant to the query to be executed, the collected context information may be condensed and filtered to remove at least some portions of the acquired context information for improved accuracy and more efficient processing. For example, in the issue tracking system case, the context information inputted to the query generation module 520 may include a summary and description of an issue raised by a developer. To this end, one or more keyword extraction methods may be employed to find the most important phrases in the description. However, aspects of the present disclosure are not limited thereto, such that any AI or ML model or method may be used. For example, named entity recognition methods (NER), summarization methods and/or any other suitable methods may be utilized. Based on the keyword extraction results, output phrases having highest score or value, or otherwise deemed as most important or relevant, may then be joined together to generate a query. The generated query is then outputted by the query generation module 520 to the retrieval and ranking module 540.

The retrieval and ranking module 540 may be configured to fetch relevant segments or portions of one or more videos corresponding to the query received from the query generation module 520. The retrieval and ranking module 540 may be another ML or AI algorithm or model that is different from the query generation module 520. According to exemplary aspects, the retrieval and ranking module 540 may retrieve the one or more video segments from the learning repository 550. Although present disclosure provides retrieval of select segments or portions of videos, aspects of the present disclosure are not limited thereto, such that corresponding supplemental data items, including but not limited to, documents, images, technical question-answering forums, presentations, contacts and the like may be retrieved along with, or in lieu of, the one or more videos. For example, if the respective video segment includes a discussion of a particular presentation or forum, a corresponding presentation and a link to the respective forum may be provided along with, or in lieu of, the video segment.

In an example, learning repository 550 may refer to an internal database storing various training or informational videos. However, aspects of the present disclosure are not limited thereto, such that the learning repository 550 may refer to a public storage (e.g., YouTube®) or a combination of both. When the learning repository 550 includes both the internal database and the public storage, the internal database may be searched first before searching the public storage. For example, the public storage may be searched only when the internal database does not produce a result. Alternatively, the publish storage may be searched while results from the internal database is being displayed to a user.

According to further aspects, each of the various training or informational videos may have been previously transcribed and embedded with metadata. The metadata may include textual description of the video at various parts of the video, and may include one or more marks to segment a video into multiple video segments. In an example, one video may be segmented into three parts, where the first part or segment describes topic A while the third part or segment describes topic C.

According to exemplary aspects, for each incoming query, the retrieval and ranking module 540 may compare an embedding of the query to transcripts embedding matrix. An embedding may refer to a numerical representation of text as a vector of real numbers, where it maps semantically similar text to similar numbers. The most relevant segments of one or more videos to a respective query may be identified by using a cosine similarity. According to exemplary aspects, the cosine similarity may be a measure of similarity between two non-zero vectors defined in an inner product space. However, aspects of the present disclosure are not limited thereto, such that any similarity metric may be utilized.

Although the present disclosure describes using transcription in videos for identifying relevant sections of a video, aspects of the present disclosure are not limited thereto, such that additional information from the videos may be utilized. For example, video tutorials may often present slides or demonstrate working with development tools or code. Extracting such multimodal information may provide the retrieval and ranking module 540 with additional dimensions to discover the most relevant sections in the video.

Further, once the video segments are retrieved or otherwise identified for retrieval, each of the video segments are scored and ranked based on their relevance by the retrieval and ranking module 540. For example, a video segment may be scored based on a number of matches between the keywords in the video query and transcription of the video segment, frequency of keywords in the transcription, video posting date, source of the video, length of the video segment or video or the like. Based on the scoring of the video segments, a rank may be assigned to each of the retrieved video segments. However, aspects of the present disclosure are not limited thereto, such that not all of the video segments may receive a rank. For example, only video segments having a score above a predetermined threshold may receive a rank.

Once ranked, the retrieval and ranking module 540 may transmit the ranked video segments to the user interface 510 for display of the ranked video segments. According to exemplary aspects, not all of the ranked video segments may be transmitted for display. For example, only video segments ranked 5 or higher may be transmitted for display to reduce network traffic.

The transmitted video segments may be displayed by the user interface 510 for selection by the developer. However, aspects of the present disclosure are not limited thereto, such that the top ranked video segment may be played automatically in a thumbnail mode, with other ranked video segments being available for selection. Along with the video segments, corresponding materials may be available for selection. For example, if the ranked video segment includes a slide presentation, the slide presentation may be provided for selection with indication that the slide presentation corresponds to the respectively ranked video segment.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for performing a video query, the method comprising:
   acquiring, by a processor, context information via a user interface of a software life cycle tool, wherein the context information is based on a current task being processed by a user and amount of time expanded for the current task;
   training, by the processor, a first machine learning (ML) model using historical data of the software life cycle tool;
   removing, by the first ML model executed by the processor, extraneous information and noise from the acquired context information;
   generating, by the first ML model executed by the processor, a query, the query including at least one keyword;
   executing, by a second ML model executed by the processor, the generated query to retrieve at least one video segment of a video file from a learning repository, wherein the video file has a plurality of segments, and each segment of the plurality of segments corresponds to a different topic;
   scoring, by the second ML model executed by the processor, the at least one video segment based on a number of matches between the at least one keyword and transcription of the at least one video segment;
   ranking, by the second ML model executed by the processor, the at least one video segment based on the scoring;
   transmitting, by the second ML model executed by the processor and to the user interface of the software life cycle tool, the ranking of the at least one video segment; and
   displaying, via the user interface of the software life cycle tool, the ranked at least one video segment.

2. The method according to claim 1, wherein the at least one video segment has been transcribed before retrieving the at least one video segment.

3. The method according to claim 1, wherein the learning repository is an internal database.

4. The method according to claim 1, wherein the learning repository is a public storage.

5. The method according to claim 1, wherein the learning repository is a combination of an internal database and a public storage.

6. The method according to claim 5, wherein the internal database is searched prior to the public storage for the at least one video segment.

7. The method according to claim 5, wherein the public storage is searched only when the at least one video segment is not stored in the internal database.

8. The method according to claim 1, wherein the generated query includes less information than the acquired context information.

9. The method according to claim 1, further comprising:
   identifying a supplemental data item included in the at least one video segment;
   retrieving the supplemental data item; and
   providing the supplemental data item along with the at least one video segment for selection.

10. The method according to claim 9, wherein the supplemental data item is indicated as corresponding to the at least one video segment.

11. The method according to claim 1, wherein the software life cycle tool is either an issue tracking system or an integrated development environments.

12. The method according to claim 1, wherein the context information is acquired based on input provided on the user interface of the software life cycle tool.

13. The method according to claim 1, wherein the context information includes at least one of a file path, software application being used, environment, network, data type, severity of issue, systems of impact, and dependencies.

14. The method according to claim 1, wherein a portion of the context information is passively captured based on a current task of a developer.

15. The method according to claim 1, wherein, in the ranking, the ranking is performed for video segments that receive a score above a reference threshold.

16. The method according to claim 1, wherein, in the transmitting, only video segments above a predetermined ranking are transmitted to the user interface.

17. The method according to claim 1, wherein, in the displaying, highest ranking video segment is played automatically upon receipt by the user interface of the software life cycle tool.

18. A system for performing a video query, the system comprising:
- a memory; and
- a processor,
- wherein the system is configured to perform:
  - acquiring context information via a user interface of a software life cycle tool, wherein the context information is based on a current task being processed by a user and amount of time expanded for the current task;
  - training a first machine learning (ML) model using historical data of the software life cycle tool;
  - removing, by the first ML model executed by the processor, extraneous information and noise from the acquired context information;
  - generating, by the first ML model executed by the processor, a query, the query including at least one keyword;
  - executing, by a second ML model executed by the processor, the generated query to retrieve at least one video segment of a video file from a learning repository, wherein the video file has a plurality of segments, and each segment of the plurality of segments corresponds to a different topic;
  - scoring, by the second ML model executed by the processor, the at least one video segment based on a number of matches between the at least one keyword and transcription of the at least one video segment;
  - ranking, by the second ML model executed by the processor, the at least one video segment based on the scoring;
  - transmitting, by the second ML model executed by the processor and to the user interface of the software life cycle tool, the ranking of the at least one video segment; and
  - displaying, via the user interface of the software life cycle tool, the ranked at least one video segment.

19. A non-transitory computer readable storage medium that stores a computer program for performing a video query, the computer program, when executed by a processor, causing a system to perform a plurality of processes comprising:
- acquiring context information via a user interface of a software life cycle tool, wherein the context information is based on a current task being processed by a user and amount of time expanded for the current task;
- training a first machine learning (ML) model using historical data of the software life cycle tool;
- removing, by the first ML model executed by the processor, extraneous information and noise from the acquired context information;
- generating, by the first ML model executed by the processor, a query, the query including at least one keyword;
- executing, by a second ML model executed by the processor, the generated query to retrieve at least one video segment of a video file from a learning repository, wherein the video file has a plurality of segments, and each segment of the plurality of segments corresponds to a different topic;
- scoring, by the second ML model executed by the processor, the at least one video segment based on a number of matches between the at least one keyword and transcription of the at least one video segment;
- ranking, by the second ML model executed by the processor, the at least one video segment based on the scoring;
- transmitting, by the second ML model executed by the processor and to the user interface of the software life cycle tool, the ranking of the at least one video segment; and
- displaying, via the user interface of the software life cycle tool, the ranked at least one video segment.

* * * * *